(12) United States Patent
Noda et al.

(10) Patent No.: US 8,126,306 B2
(45) Date of Patent: Feb. 28, 2012

(54) TWO-DIMENSIONAL PHOTONIC CRYSTAL

(75) Inventors: Susumu Noda, Kyoto (JP); Takashi Asano, Kyoto (JP); Keita Mochizuki, Fujisawa (JP)

(73) Assignee: Kyoto University, Kyoto (JP)

( * ) Notice: Subject to any disclaimer, the term of this patent is extended or adjusted under 35 U.S.C. 154(b) by 310 days.

(21) Appl. No.: 12/530,317

(22) PCT Filed: Mar. 25, 2008

(86) PCT No.: PCT/JP2008/000709
§ 371 (c)(1),
(2), (4) Date: Dec. 7, 2009

(87) PCT Pub. No.: WO2008/117533
PCT Pub. Date: Oct. 2, 2008

(65) Prior Publication Data
US 2010/0104250 A1    Apr. 29, 2010

(30) Foreign Application Priority Data

Mar. 26, 2007 (JP) ................................. 2007-079342

(51) Int. Cl.
*G02B 6/10* (2006.01)
*B29D 11/00* (2006.01)
*H01L 21/00* (2006.01)

(52) U.S. Cl. ........ 385/129; 385/130; 385/131; 385/132; 385/122; 264/1.1; 438/29; 438/31

(58) Field of Classification Search .................. 385/122, 385/129, 130, 131, 132, 14, 141; 438/29, 438/31; 264/1.1
See application file for complete search history.

(56) References Cited

U.S. PATENT DOCUMENTS
7,194,174 B2 *  3/2007  Dridi et al. .................... 385/129
(Continued)

FOREIGN PATENT DOCUMENTS
CN        100487503 C       5/2009
(Continued)

OTHER PUBLICATIONS

Mochizuki et al.; "Analysis of the thermal radiation from two-dimensional photonic crystal slabs using intersubband transitions in quantum well;" *Japan Society of Applied Physic;* 206 Autumn 67th Joint Symposia on Applied Physics; Third Part Issue; Aug. 29, 2006; Lecture No. 31p-ZD-12.

(Continued)

*Primary Examiner* — Brian Healy
(74) *Attorney, Agent, or Firm* — Oliff & Berridge, PLC (57) ABSTRACT

A two-dimensional photonic crystal according to the present invention includes a first layer having a dielectric first layer slab in which first layer holes having a refractive index lower than that of the first layer slab are arranged cyclically, a second layer formed on the first layer, including dielectric columns having a refractive index higher than the air arranged in the air with the same cycle as the first layer hole, and a third layer having a dielectric third layer slab in which third layer holes having a refractive index lower than that of the third layer slab are arranged cyclically. Thus, it is possible to obtain the two-dimensional photonic crystal that can create a wider complete PBG than before regardless of the polarization of light and can be manufactured easily.

13 Claims, 9 Drawing Sheets

U.S. PATENT DOCUMENTS

| | | | |
|---|---|---|---|
| 7,233,730 B1 * | 6/2007 | Rodgers et al. | 385/131 |
| 7,406,221 B2 * | 7/2008 | Noda et al. | 385/30 |
| 7,853,111 B2 * | 12/2010 | Noda et al. | 385/129 |
| 7,957,620 B2 * | 6/2011 | Noda et al. | 385/129 |
| 2004/0264903 A1 * | 12/2004 | Dridi et al. | 385/129 |
| 2005/0220402 A1 | 10/2005 | Takagi et al. | |
| 2006/0034577 A1 | 2/2006 | Furuya et al. | |
| 2006/0204161 A1 * | 9/2006 | Noda et al. | 385/1 |
| 2006/0204173 A1 | 9/2006 | Suzuki et al. | |
| 2006/0263025 A1 | 11/2006 | Sugita et al. | |
| 2007/0172188 A1 * | 7/2007 | Noda et al. | 385/130 |
| 2010/0104250 A1 * | 4/2010 | Noda et al. | 385/129 |

FOREIGN PATENT DOCUMENTS

| | | |
|---|---|---|
| EP | 1 585 087 A1 | 10/2005 |
| JP | A-2000/284136 | 10/2000 |
| JP | A-2001-74955 | 3/2001 |
| JP | A-2001-272555 | 10/2001 |
| JP | A-2001-296442 | 10/2001 |
| JP | A-2004-219688 | 8/2004 |
| JP | A-2005-258406 | 9/2005 |
| JP | A-2005-284043 | 10/2005 |
| JP | A-2006-30279 | 2/2006 |
| JP | B2-3830962 | 7/2006 |
| JP | A-2006251063 | 9/2006 |
| WO | WO 2005/064373 A1 | 7/2005 |
| WO | WO 2005/114279 A1 | 12/2005 |

OTHER PUBLICATIONS

International Search Report mailed on May 13, 2008 in the corresponding International Application No. PCT/JP2008/000709.

* cited by examiner

FIG. 2

(a) FIRST LAYER 21

(b) SECOND LAYER 22

(c) THIRD LAYER 23

(a) SECOND LAYER 22

(b) SECOND LAYER 22

(c) SECOND LAYER 22    FIRST LAYER 21

FIG. 7

(a) FIRST LAYER 21

(b) SECOND LAYER 22

TWO-DIMENSIONAL PHOTONIC CRYSTAL

TECHNICAL FIELD

The present invention relates to a two-dimensional photonic crystal that is used for an optical device such as an optical multiplexer/demultiplexer, or a thermal radiation light source or the like. Note that the term "light" or "optical" used in this patent application includes electromagnetic waves in general as well as visible light.

BACKGROUND ART

Devices utilizing a photonic crystal have been developed for the purpose of achieving high performance, small size and low cost in the field of optical communication devices such as an optical multiplexer/demultiplexer which is used for the wavelength division multiplexing communication (WDM). A photonic crystal is a dielectric body having an artificial cyclic structure. The cyclic structure is usually formed by arranging areas (modified refractive index areas) having a refractive index different from that of the dielectric main body cyclically in the dielectric main body. The cyclic structure creates a band structure with respect to light energy in the crystal, so that an energy region or regions are formed in which light cannot propagate. Such an energy region is called the "photonic band gap (PBG)". The energy region (or a wavelength band) in which the PBG is formed is determined depending on the refractive index of the dielectric and the cycle of the cyclic structure.

Patent Document 1 discloses a two-dimensional photonic crystal having a main body (or slab) provided with modified refractive index areas arranged cyclically, in which a linear defect is provided to the cyclic arrangement so as to form a waveguide, and a point-like defect is provided to the cyclic arrangement beside the waveguide so as to form a resonator. This two-dimensional photonic crystal has two functions. One is a demultiplexer for extracting light having a wavelength equal to the resonance wavelength of the resonator from light having various wavelengths propagating in the waveguide to the outside. Another function is a multiplexer for introducing the light from the outside into the waveguide.

Figure 1:
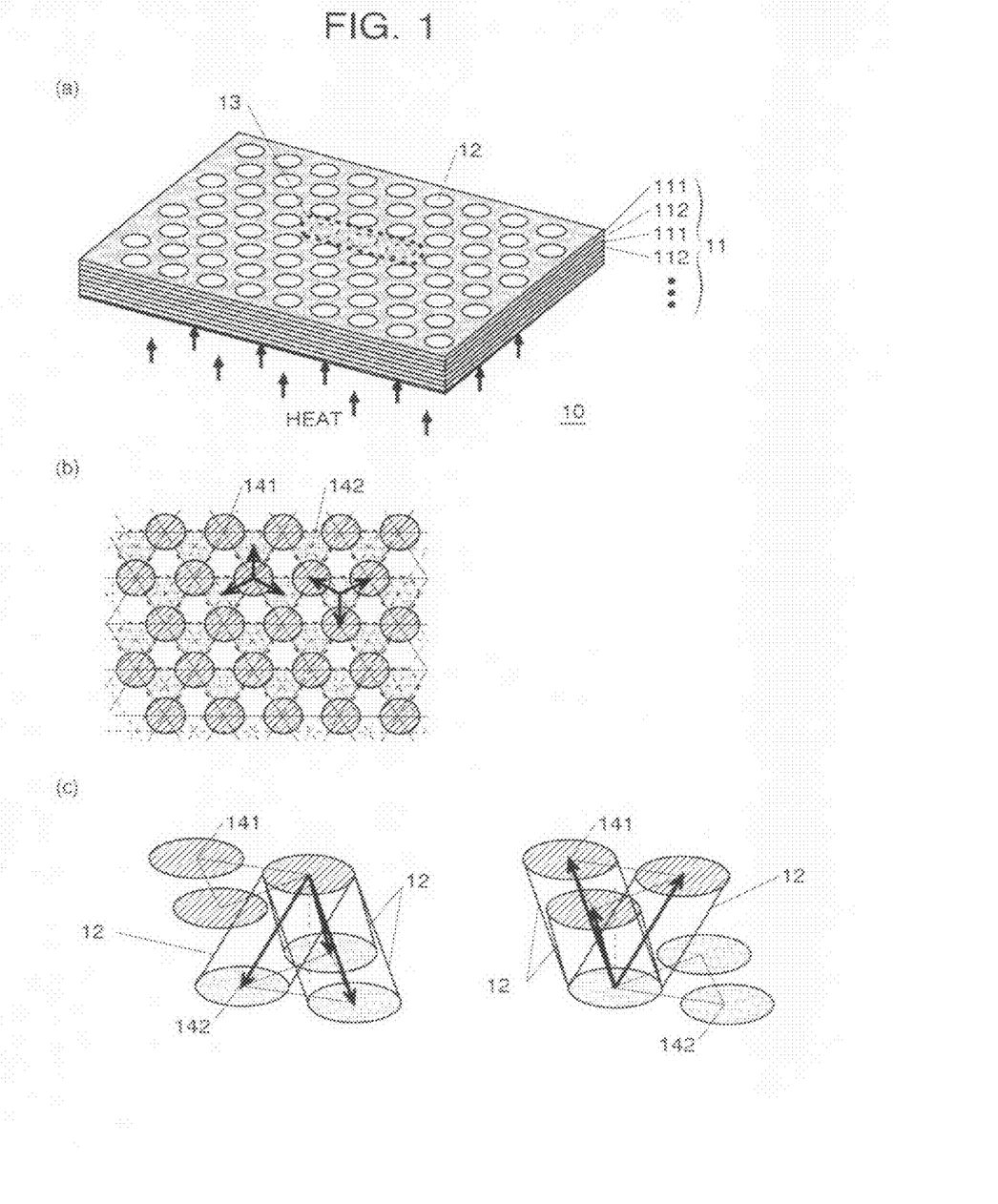
FIG. 1 is a perspective view (a) of an example of a conventional polarization-independent two-dimensional photonic crystal, a plan view (b) of holes 12 formed in a two-dimensional photonic crystal 11, and a perspective view (c) of the holes 12.

In addition, recently, it is studied to use the two-dimensional photonic crystal as a thermal radiation light source. Non-Patent Document 1 describes a two-dimensional photonic crystal 10 as illustrated in FIG. 1(a), in which holes 12 are arranged cyclically in a slab 11 having a quantum well structure constituted of a plurality of laminated semiconductor plates 111, 112, ... made of different semiconductor materials, and a point like part of the holes are omitted to form a point-like defect resonator 13. As illustrated in FIGS. 1(b) and 1(c), every hole 12 is disposed on a lattice point 141 of a triangular lattice on an upper surface of the slab, and is disposed on a lattice point 142 on a lower surface just below the barycenter of every regular triangle of the upper surface triangular lattice. Further, between the upper surface and the lower surface, every hole 12 on the upper surface extends from the upper lattice point 141 aslant in three directions toward three lower lattice points 142 that are closest to the upper lattice point 141. Every hole 12 on the lower surface extends from the lower lattice point 142 aslant in three directions toward three upper lattice points 141 that are closest to the lower lattice point 142. When the two-dimensional photonic crystal 10 is heated, transition of electrons or holes occurs between discrete energy levels (subbands) formed in the quantum well so as to generate light having the wavelength corresponding to the energy difference. Intensity of this light is amplified by the point-like defect resonator 13, and the light is emitted to the outside of the two-dimensional photonic crystal 10.

A usual thermal radiation source emits a wide band of infrared rays similar to the black body spectrum. Therefore, in order to use the thermal radiation source for a spectral analysis of gas contents or the like, it is necessary to extract a desired wavelength from the band by using a filter. In contrast, a thermal radiation light source using the two-dimensional photonic crystal can inherently emit only light having a desired wavelength, so it is expected to improve the energy utility efficiency.

[Patent Document 1] Unexamined Japanese Patent Publication No. 2001-272555 ([0023]-[0027], [0032], FIGS. 1, and 5-6)

[Non-Patent Document 1] Keita MOCHIZUKI et al. "Analysis of Thermal Radiation Spectrum from Two-dimensional Photonic Crystal Slab with Quantum Well Having Transition between Subbands", 2006 Autumn 67th Joint Symposia on Applied Physics, third part issue, Japan Society of Applied Physics, Aug. 29, 2006, lecture number 31p-ZD-12

DISCLOSURE OF THE INVENTION

Problem to be Solved by the Invention

Optical devices such as a wavelength multiplexer/demultiplexer are designed in many cases so that the PBG is formed with respect to either one of the TE-polarized light in which the electric field oscillates in the direction parallel to the main body and the TM-polarized light in which the electric field oscillates in the direction perpendicular to the main body. For instance, in the two-dimensional photonic crystal described in Patent Document 1, the PBG is formed only with respect to the TE-polarized light, but the PBG is not formed with respect to the TM-polarized light. In this case, if light containing both the TE and the TM polarizations is introduced in the waveguide or the resonator of the two-dimensional photonic crystal, the TM-polarized light may be dissipated from the waveguide or the resonator into the main body so that a loss may occur.

On the other hand, the two-dimensional photonic crystal 10 described in Non-Patent Document 1 (FIG. 1) has an advantage that the PBG can be formed regardless of the polarization direction because the modified refractive index area has the symmetry of $C_{3v}$ by the Schoenflies symbol (or 3m by the Hermann-Mauguin symbol) and has an asymmetry in the direction perpendicular to the slab. In this way, the PBG that is formed with respect to every polarization is called a "complete PBG". However, the two-dimensional photonic crystal 10 has a disadvantage that it needs a highly sophisticated manufacturing technique because three holes 12 must be formed in the direction inclined to the slab 11 from three different points on one surface of the slab toward one point on the other surface.

It is desired for the wavelength multiplexer/demultiplexer that the two-dimensional photonic crystal should have a wider complete PBG for multiplexing and demultiplexing light having various wavelengths regardless of the polarization direction. In addition, for usage as a thermal radiation source, it is required to suppress unwanted emission in a wide band and to improve energy utility efficiency in light emission at a desired wavelength. However, the width of the complete PBG in the above-mentioned two-dimensional photonic crystal 10 is only approximately 15% at the maximum of a median of the energy for obtaining the complete PBG.

It is an object of the present invention to provide the two-dimensional photonic crystal that can obtain a wider complete PBG than before regardless of a polarization direction, and can be manufactured easily.

Means for Solving the Problem

A two-dimensional photonic crystal according to the present invention for solving the above-mentioned problems includes:

a) a first layer composed of a first medium made of a dielectric plate in which first modified refractive index areas having a refractive index lower than that of the first medium are arranged cyclically;

b) a second layer formed on the first layer, the second layer composed of a second medium having a predetermined dielectric constant in which second modified refractive index areas having a refractive index higher than that of the second medium are arranged with the same cycle as the first modified refractive index areas; and c) a third layer formed on the second layer, the third layer composed of a third medium made of a dielectric plate in which third modified refractive index areas having a refractive index lower than that of the third medium are arranged with the same cycle as the first modified refractive index areas.

It is preferable to set:

the first modified refractive index areas are arranged at the lattice points of a first triangular lattice, the third modified refractive index areas are arranged at the lattice points of a third triangular lattice which is the lattice rotated by 180 degrees about the axis that is perpendicular to the third layer and passes through the barycenter of the regular triangle constituted of the three nearest lattice points in the first triangular lattice (hereinafter the relationship between the first triangular lattice and the third triangular lattice is referred to as "symmetric"), and the second modified refractive index areas are arranged at the lattice points of a second triangular lattice which is composed of the above-described barycenters (hereinafter the relationship between the first triangular lattice and the second triangular lattice is referred to as "complementary").

The two-dimensional photonic crystal of the present invention that can be used as a wavelength multiplexer/demultiplexer includes:

a point-like defect resonator constituted of at least one defect formed for at least one of the first modified refractive index areas, the second modified refractive index areas and the third refractive index areas, and a waveguide disposed in a vicinity of the point-like defect resonator and constituted of a linear defect formed in at least one of the first modified refractive index areas, the second modified refractive index area and the third refractive index area.

The two-dimensional photonic crystal of the present invention that can be used as a thermal radiation light source includes:

a point-like defect resonator constituted of at least one defect formed in at least one of the first modified refractive index areas, the second modified refractive index areas and the third refractive index areas, and a quantum well structure in which one or more of the first medium, the second modified refractive index areas and the third medium are constituted of a plurality of types of laminated semiconductors, and a transition energy between sub-bands corresponding to the resonance wavelengths of the point-like defect resonator is formed.

A manufacturing method of a two-dimensional photonic crystal according to the present invention includes the steps of:

a) forming second modified refractive index areas constituted of dielectric column members cyclically on a substrate;

b) heat-bonding an end of the column member to a first layer composed of a first medium constituted of a dielectric plate and first modified refractive index areas that have a refractive index lower than that of the first medium and are arranged cyclically in the first medium;

c) removing the substrate; and d) heat-bonding the other end of the column member to a third layer composed of a third medium constituted of a dielectric plate and third modified refractive index areas that have a refractive index lower than that of the third medium and are arranged cyclically in the third medium.

Effects of the Invention

The two-dimensional photonic crystal according to the present invention has a structure in which the first (or third) medium having higher refractive index than the first (or third) modified refractive index areas extends in the direction parallel to the two-dimensional photonic crystal in the first layer and the third layer, while the second modified refractive index areas having higher refractive index than the second medium extends in the direction perpendicular to the two-dimensional photonic crystal in the second layer. Such a structure is adopted for the following reason. The direction of electric field in the light distributed in the two-dimensional photonic crystal slab differs between the center and the near-surface of the slab. Therefore, the two-dimensional photonic crystal according to the present invention is designed to have a three-layered structure, corresponding to the above-described electric field direction, including a photonic crystal center layer (the second layer) and the surface layers (the first layer and the third layer) sandwiching the second layer so that each layer is optimized with respect to the electric field direction. When such a structure is adopted, the two-dimensional photonic crystal according to the present invention can create a complete PBG for preventing propagation of light having a predetermined wavelength band and polarized in any direction.

Among the two-dimensional photonic crystals of the present invention, the one having a symmetric arrangement between the first modified refractive index area and the third modified refractive index area, and a complementary arrangement of the second modified refractive index area for the first modified refractive index area and the third modified refractive index area can obtain a complete PBG larger than that of the other two-dimensional photonic crystal of the present invention. It is because the crystal structure has the $C_{3v}$ (or 3m) symmetry similarly to the two-dimensional photonic crystal described in Non-Patent Document 1. In addition, such a two-dimensional photonic crystal of the present invention having the three-layered arrangement can create the complete PBG larger than the two-dimensional photonic crystal described in Non-Patent Document 1. It is because the structure has the above-mentioned refractive index distribution in addition to the symmetry of the crystal structure.

The two-dimensional photonic crystal according to the present invention is manufactured by the two steps as follows: (i) the step of manufacturing the individual layers, that are the first layer to the third layer, and (ii) the step of bonding the first layer to the second layer, and the second layer to the third layer. The step (i) can be performed easily by using a photolithography method or the like as described in Patent Document 1, for example. In addition, the step (ii) can be performed easily by the heat bonding method that is used for manufacturing a three-dimensional photonic crystal (see, for example, Unexamined Japanese Patent Publication No. 2001-074955, paragraphs 0031 to 0034 and FIG. 8). Therefore, the two-dimensional photonic crystal according to the present invention can be manufactured more easily than the two-dimensional photonic crystal described in Non-Patent Document 1.

EXPLANATION OF NUMERALS

10 . . . Two-Dimensional Photonic Crystal
11 . . . Slab
111, 112 . . . Semiconductor Plate
12 . . . Hole
13, 322C, 34P, 35P . . . Point-like Defect Resonator
141 . . . Upper Lattice Point
142 . . . Lower Lattice Point
20 . . . Two-Dimensional Photonic Crystal
21 . . . First Layer
211, 411 . . . First Layer Slab
212, 212A, 312 . . . First Layer Hole
22 . . . Second Layer
222, 222A, 222B, 322, 322A . . . Dielectric Column
23 . . . Third Layer
231, 431 . . . Third Layer Slab
232, 232A, 332 . . . Third Layer Hole
312A . . . One Hole Defect
312L, 322L, 34L . . . Linear Defect Waveguide
322A . . . One Dielectric Column Defect
322B . . . Regular Triangle Column Defect
34C . . . Three Hole Defects
40 . . . Two-Dimensional Photonic Crystal for Thermal Radiation Light Source
4311 . . . First Semiconductor Plate Member
4312 . . . Second Semiconductor Plate Member
511 . . . First Substrate
512 . . . Second Substrate
513 . . . Third Substrate
61 . . . Complete PBG

BEST MODE FOR CARRYING OUT THE INVENTION

Figure 2:
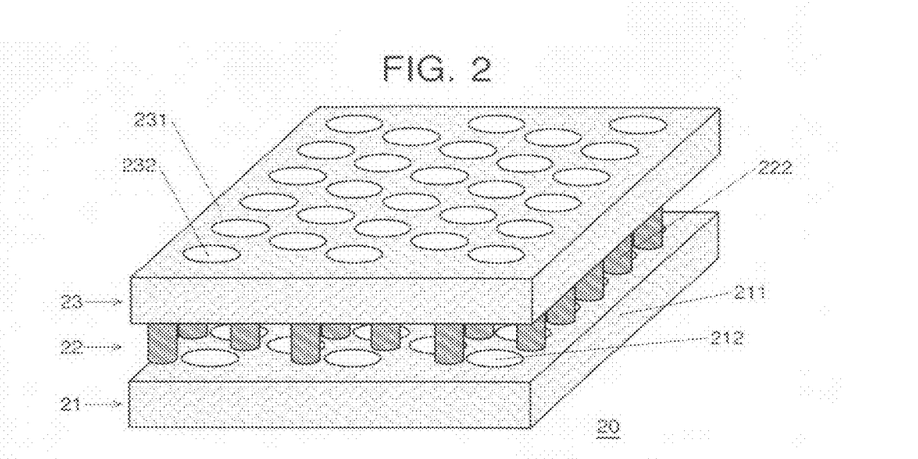
FIG. 2 is a perspective view illustrating a two-dimensional photonic crystal 20 as an embodiment of the two-dimensional photonic crystal according to the present invention.
Figure 3:
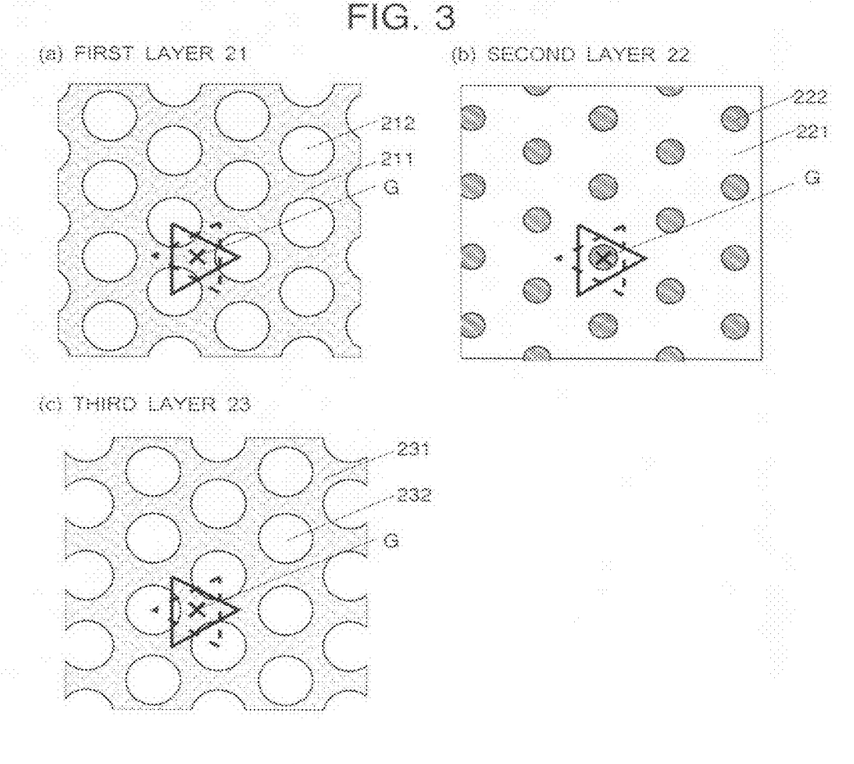
FIG. 3 are plan views of a first layer 21, a second layer 22 and a third layer 23 of the two-dimensional photonic crystal 20 according to the embodiment.
Figure 4:
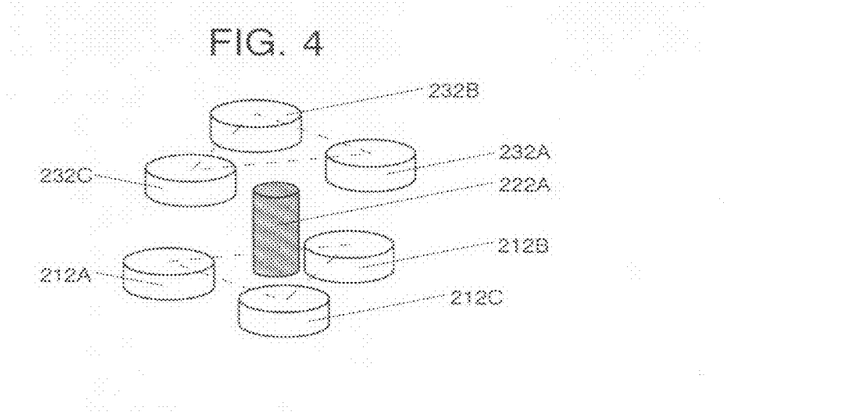
FIG. 4 is a perspective view illustrating a dielectric column 222A and three first layer holes 212A-212C closest to the dielectric column 222A as well as three third layer holes 232A-232C closest to the dielectric column 222A.

An embodiment of a two-dimensional photonic crystal according to the present invention is described with reference to FIGS. 2 to 4. FIG. 2 is a perspective view of a two-dimensional photonic crystal 20 according to the present embodiment. The two-dimensional photonic crystal 20 has a three-layered structure including a first layer 21, a second layer 22 and a third layer 23. FIG. 3 is plan views of the individual layers. The first layer 21 is composed of a first layer slab (first medium) 211 made of a dielectric plate provided with first layer holes of a circular shape (first modified refractive index areas) 212 arranged on a triangular lattice (FIG. 3(a)). The second layer 22 is composed of dielectric columns of a cylindrical shape (second modified refractive index area) 222 arranged in air (second medium) on a triangular lattice having the same cycle as the first layer hole 212 (FIG. 3(b)). The third layer 23 is composed of, similarly to the first layer 21, a third layer slab (third medium) 231 made of a dielectric plate provided with third layer holes of a circular shape (third modified refractive index area) 232 on a triangular lattice (FIG. 3(c)).

The first layer holes 212 and the third layer holes 232 have the symmetric arrangement as described above, and the dielectric columns 222 of the second layer have a complementary arrangement for the first layer holes 212 and the third layer holes 232. This relationship is described in detail. The regular triangle shown in the thick solid line in FIGS. 3(a) to 3(c) has vertexes each located on a first layer hole 212. Every dielectric column 222 is located at the barycenter G of the regular triangle shown in the thick solid line. The third layer holes 232 are located at the vertexes of a regular triangle shown in the thick broken line which is rotated by 180 degrees from the regular triangle of the thick solid line about the axis standing on the barycenter G perpendicular to the third layer 23.

When the first layer holes 212, the dielectric columns 222 and the third layer holes 232 are arranged in this way, the dielectric column 222 is located not only at the barycenter G of the regular triangle of the thick solid line as described above but also at the barycenter of the regular triangle of the thick broken line. Therefore, the dielectric columns 222 do not abut the first layer hole 212 and the third layer hole 232, but abut the first layer slab 211 and the third layer slab 231, so that the first layer slab 211 can be bonded to the dielectric column 222, and that the third layer slab 231 can be bonded to the dielectric column 222.

In addition, the positional relationship between the first layer holes 212 and the third layer holes 232 is the same as the positional relationship between the upper lattice points 141 and the lower lattice points 142 in the two-dimensional photonic crystal 10 as described above.

As the material of the first layer slab 211 and the third layer slab 231, Si, InGaAsP, GaAs, AIGaAs or the like can be used, for example. Similarly, as the material of the dielectric column 222, Si, InGaAsP, GaAs, AIGaAs or the like can be used. Different materials may be used for the first layer slab 211 and/or the third layer slab 231 and the dielectric column 222. However, it is desirable to use the same material so that good junction is obtained between them. In contrast, if the thermal radiation light source should emit thermal radiation light only from one of the first layer and the third layer, for example, different material may be used for the first layer slab 211 and the third layer slab 231. In this case, a material different from that of the first layer slab 211 and/or the third layer slab 231 may be used for the dielectric column 222.

The two-dimensional photonic crystal 20 of the present embodiment creates a complete PBG because of two reasons. The first reason is as follows. In a conventional slab-shaped two-dimensional photonic crystal of a single layer, the PBG is created relatively easily for the TE-polarized light, but not created for the TM-polarized light. This is because the TM-polarized light mode has the electric field distribution in which the electric field is usually parallel to the plane of the slab near the surface of the two-dimensional photonic crystal, but is perpendicular to the slab near the center. Therefore, it is difficult to create the PBG in the conventional structure constituted of a single uniform layer. In contrast, the two-dimensional photonic crystal 20 of the present embodiment uses the first layer slab 211 and the third layer slab 231 having higher refractive indexes than the modified refractive index areas of the first layer 21 and the third layer 23, so that the PBG is created easily for the electric field distribution near the surface. In addition, the second layer 22 is constituted of the dielectric columns 222 having higher refractive index than air (second medium), so that the PBG is created easily for the electric field distribution near the center. Thus, the two-dimensional photonic crystal 20 of the present embodiment can create the complete PBG, because the surface layer and the center layer have different structures corresponding to the electric field distributions in the individual layers.

The second reason comes from the complementary arrangement. In case of the complementary arrangement, one dielectric column 222A, the three first layer holes 212A-212C closest to the dielectric column 222A and the three third layer holes 232A-232C closes to the dielectric column 222A (FIG. 4) form the $C_{3v}$ (3m) symmetry. Thus, the two-dimensional photonic crystal 20 has the complete PBG because of the same reason as the two-dimensional photonic crystal described in Non-Patent Document 1.

The above embodiment has the complete PBG because the first layer and the third layer are located in the symmetric positions, and both the first and the third layers are located in the complementary positions for the second layer. Even in other embodiments, i.e., in the case where the three layers including the first layer holes 212, the dielectric columns 222 and the third layer holes 232 are not located in the symmetric or complementary positions for each other, the two-dimensional photonic crystal including the first to the third layers having the above-mentioned refractive index distribution can have the complete PBG because of the first reason described above.

Instead of the hole used in the two-dimensional photonic crystal 20 as the first modified refractive index area and the third modified refractive index area, any stuff having a lower refractive index than the first medium and the third medium can be used. The hole has an advantage in that the difference in the refractive index compared to the first medium and the third medium is larger than in the case of using the low refractive index member. The low refractive index stuff, on the other hand, has an advantage in that it is more resistant to deformation in a heat treatment than in the case of using the hole. Further, instead of the air in the two-dimensional photonic crystal 20 as the second medium, a plate having a smaller refractive index than the second modified refractive index area can be used. The second medium constituted of air has an advantage that a difference of refractive index between the air and the second modified refractive index area is larger than that in the case of using the plate similarly to the case of the hole as described above. The second medium constituted of the plate has an advantage in retaining the first layer and/or the third layer by the second layer.

Figure 5:
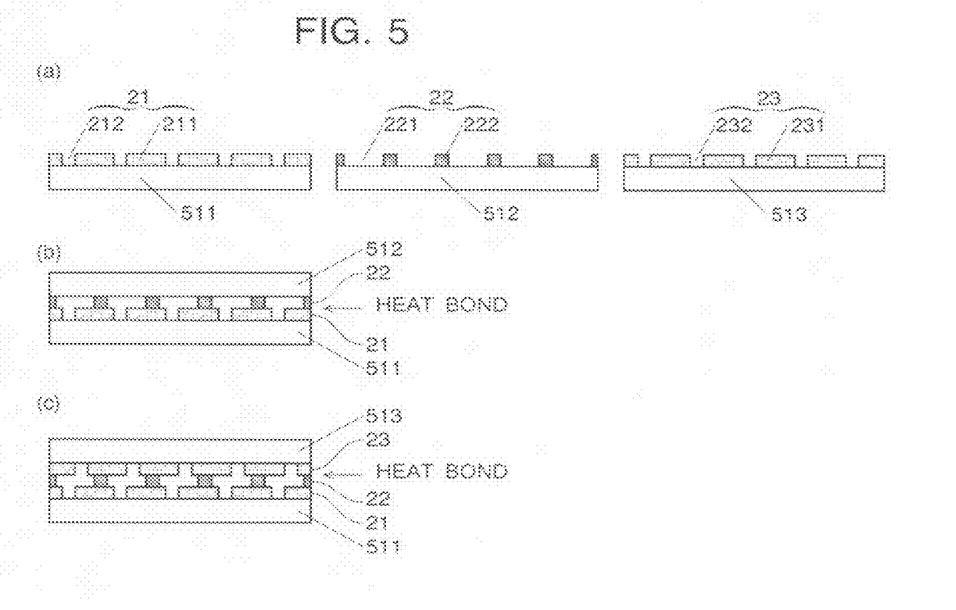
FIG. 5 illustrates vertical cross sections showing a manufacturing method of the two-dimensional photonic crystal according to the present embodiment.

With reference to FIG. 5, the manufacturing method of the two-dimensional photonic crystal according to the present invention is described. Here, the two-dimensional photonic crystal 20 of the above embodiment is used as an example, but two-dimensional photonic crystals of other embodiments can also be manufactured in the same manner.

First, the first layer 21, the second layer 22 and the third layer 23 are manufactured independently by the following method (a).

The first layer 21 is manufactured by forming the first layer slab 211 on the first substrate 511 and forming the first layer holes 212 in the first layer slab 211. Here, the first layer slab 211 is manufactured by a usual method such as a vapor deposition method or a CVD method in accordance with the material thereof. The first layer holes 212 can be formed by a usual method such as the photolithography and etching method. The third layer 23 can be formed on the third substrate 513 by the same method as the first layer 21. The second layer 22 can be manufactured by first forming a dielectric layer of the material of the dielectric columns 222 on the second substrate 512, and then removing the part other than the dielectric columns 222 by the photolithography and etching method.

Next, the first layer 21 and the second layer 22 are overlaid with each other and heated, so that the first layer 21 and the second layer 22 are bonded by heat (b). Here, when the first layer 21 and the second layer 22 are overlaid, positions of the first layer 21 and the second layer 22 are adjusted so that the first layer holes 212 and the dielectric columns 222 have the complementary relationship. Heat bonding of the two layers like the present example is performed when a three-dimensional photonic crystal is manufactured (see the above-mentioned Unexamined Japanese Patent Publication No. 2001-074955). Next, the second substrate 512 is removed, and then similarly to the heat bonding of the first layer 21 with the second layer 22, the second layer 22 and the third layer 23 are overlaid so that the dielectric columns 222 and the third layer holes 232 have the complementary relationship, and they are bonded by heat (c). Thus, the two-dimensional photonic crystal 20 is obtained.

Figure 6:
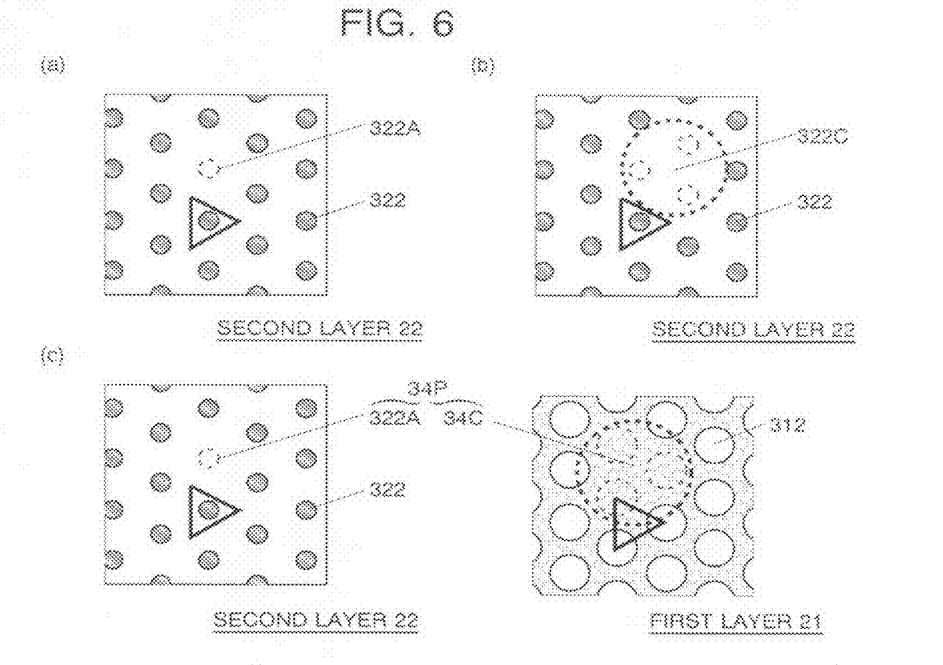
FIG. 6 are plan views showing examples of two-dimensional photonic crystals according to the present invention having a point-like defect resonator.

In the two-dimensional photonic crystal according to the present invention, at least one defect is created in one or more of the first modified refractive index areas, the second modified refractive index areas and the third refractive index areas, so that a point-like defect resonator can be formed. This defect can be formed by making a part of the first (second or third) modified refractive index areas have a size and/or a shape different from the other first (second or third) modified refractive index areas or by omitting (i.e. not forming) the part of the first (second or third) modified refractive index areas. For instance, in the two-dimensional photonic crystal 20, it is possible to create a point-like defect resonator constituted of only one defect of a dielectric column 322, a first layer hole 312 or a third layer hole 332. FIG. 6(a) illustrates an example of the point-like defect resonator constituted of only one defect of the dielectric column 322A. It is also possible to create a point-like defect resonator 322C constituted of a defect of the dielectric column 322A and two dielectric columns 322 next to the dielectric column 322A, i.e. total three dielectric columns (FIG. 6(b)). The same is true for the cases of the first layer hole 312 and the third layer hole 332. Alternatively, it is possible to create a point-like defect resonator 34P constituted of a defect of a dielectric column 322A and a three hole defect 34C constituted of defects of three first layer holes 312 and/or the third layer holes 332 neighboring the dielectric column 322A (FIG. 6(c)).

Figure 7:
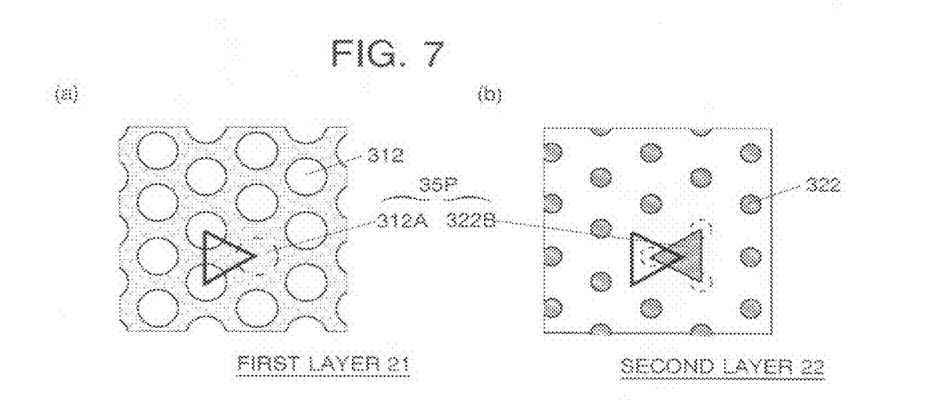
FIG. 7 are plan views showing another example of the point-like defect resonator.

FIG. 7 illustrates another example of the point-like defect resonator. This point-like defect resonator 35P is constituted of one hole defect 312A formed by omitting one of the holes 312 in the first layer 21 and a regular triangle column defect 322B made of a regular triangle column with the bottom vertexes located at positions of three dielectric columns closest to the hole defect 312A and disposed instead of the three dielectric columns. Note that a point-like defect resonator constituted of a hole defect 312A alone or of a regular triangle column defect 322B alone also properly works as the point-like defect resonator.

Figure 8:
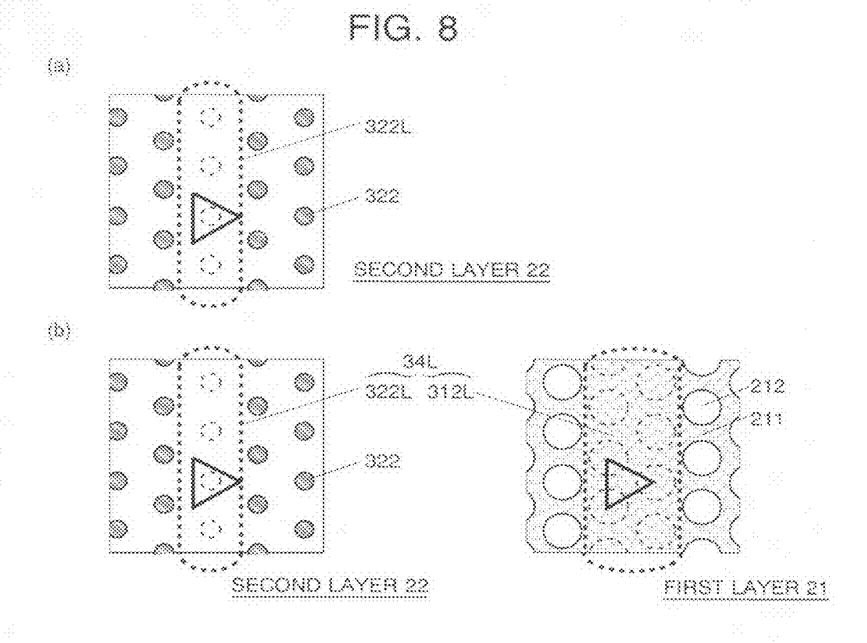
FIG. 8 are plan views showing examples of two-dimensional photonic crystals according to the present invention with a linear defect waveguide.

Similarly to the point-like defect resonator, a waveguide can be formed by creating a linear defect in one or more of the first modified refractive index areas, the second modified refractive index areas and the third refractive index areas. For instance, in the two-dimensional photonic crystal 20, it is possible to create a linear defect (waveguide) 322L by introducing a row of defects exclusively in the dielectric columns 222 (FIG. 8(a)), or a waveguide 34L constituted of a linear defect 322L and a linear defect 312L formed by introducing a row of defects constituted of the first layer holes 212 next to the linear defect 322L (FIG. 8(b)).

Figure 9:
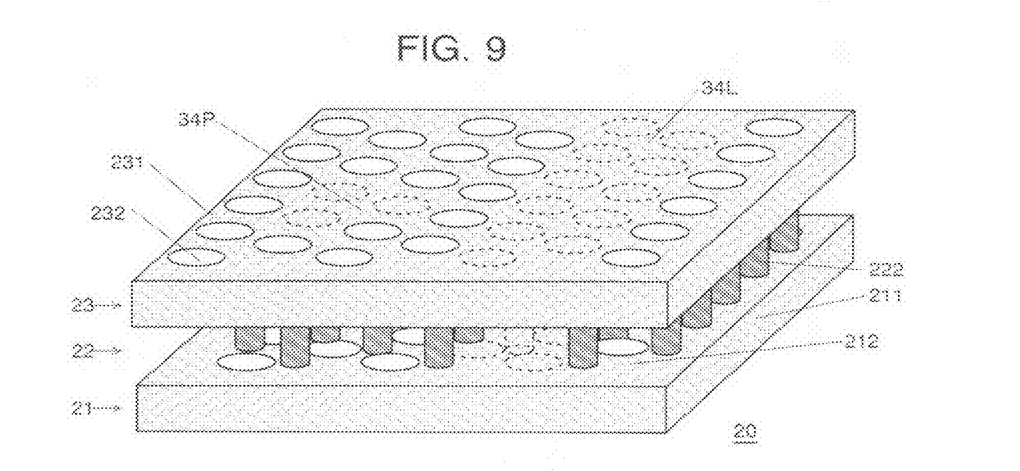
FIG. 9 is a perspective view illustrating an example of a wavelength multiplexer/demultiplexer using the two-dimensional photonic crystal according to the present invention.

Thus, the point-like defect resonator is disposed in the vicinity of the linear defect waveguide so that the two-dimensional photonic crystal according to the present invention can be used as a wavelength multiplexer/demultiplexer (FIG. 9).

Figure 10:
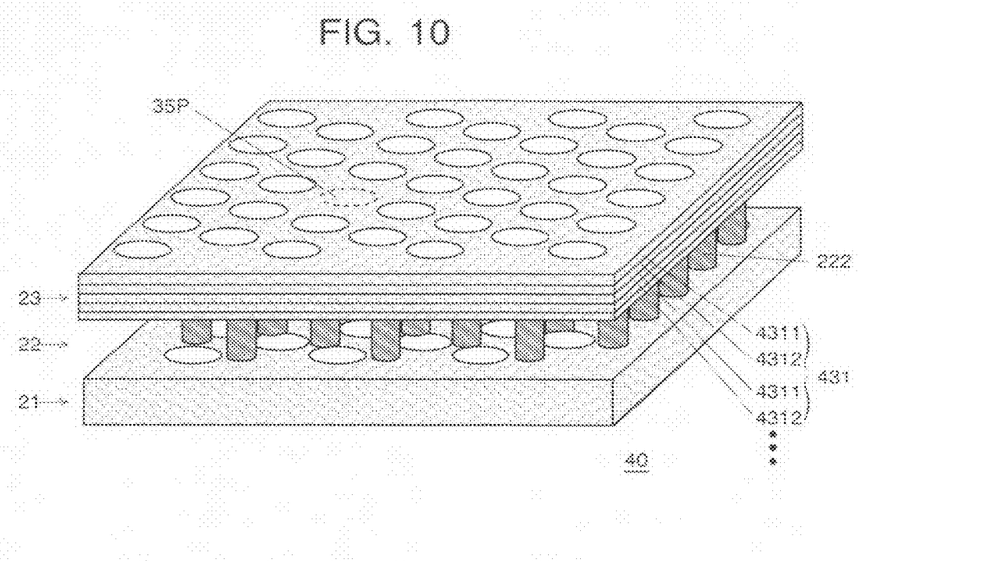
FIG. 10 is a perspective view illustrating an example of a two-dimensional photonic crystal 40 for a thermal radiation light source according to the present invention.

In addition, the two-dimensional photonic crystal according to the present invention can be used as a thermal radiation light source by adopting the following structure. Similarly to the conventional method of using the slab 11 of the two-dimensional photonic crystal 10 as the thermal radiation light source, one or more of the first medium, the second modified refractive index areas and the third medium are constituted of a lamination including a plurality of different types of semiconductor layers, and similarly to the above-mentioned wavelength multiplexer/demultiplexer, a point-like defect resonator is disposed. Specifically, as illustrated in FIG. 10, using a third layer slab 431 in which a first semiconductor plate member 4311 and a second semiconductor plate member 4312 made of different semiconductor materials are laminated, the above-mentioned point-like defect resonator 35P is disposed in the dielectric column 222 and the third layer slab 431, so that the two-dimensional photonic crystal 40 for a thermal radiation light source can be constituted.

EXAMPLE 1

Figure 11:
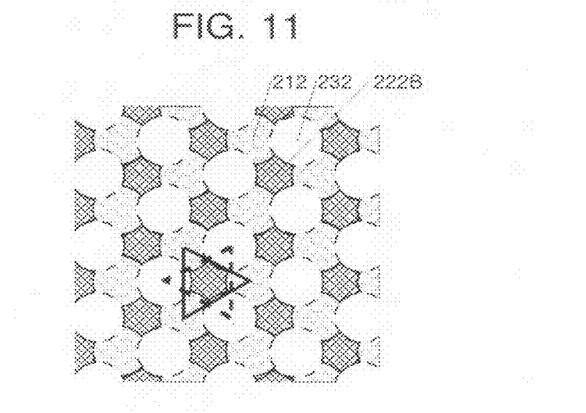
FIG. 11 is a plan view illustrating the shape of the dielectric column of the two-dimensional photonic crystal according to a first example.

Concerning an example of the two-dimensional photonic crystal of the present invention, a band calculation result by the FDTD method is described below. This calculation was performed for the case where the first layer and the third layer have the same structure as the two-dimensional photonic crystal 20 described above. The second layer has a structure in which, instead of the cylindrical dielectric columns 222 in the two-dimensional photonic crystal 20, dielectric columns 222B are disposed on the entire areas that do not abut the first layer holes 212 and the third layer holes 232 as illustrated in FIG. 11. The thickness of the first layer 21 is set to be 0.2 times (0.2a) the cycle distance a of the first layer holes 212, the thickness of the second layer 22 is set to be 0.4a, and the thickness of the third layer 23 is set to be 0.2a. Then, a change in the band due to the value of r of the first layer hole 212 and the third layer hole 232 is calculated.

Figure 12:
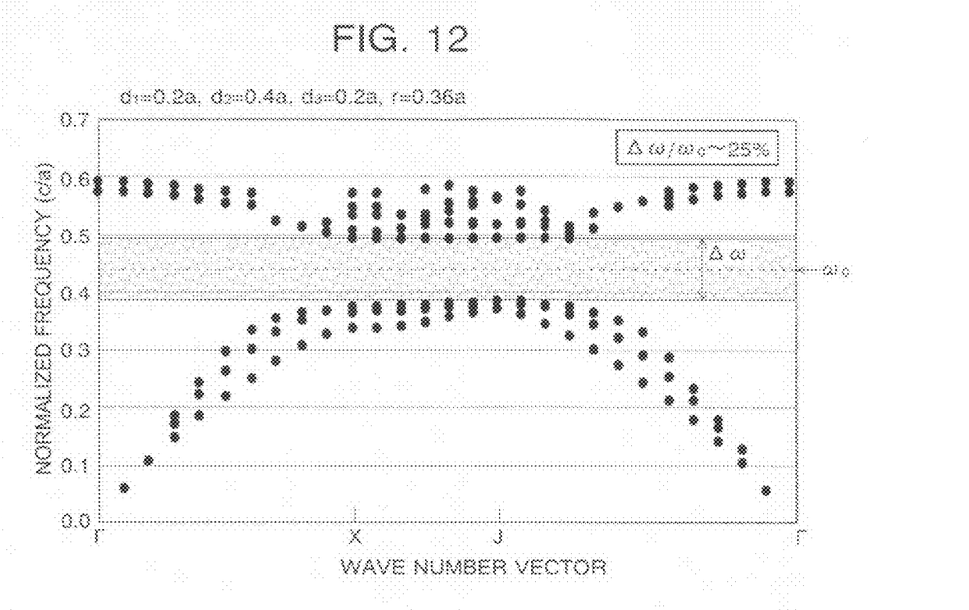
FIG. 12 is a graph illustrating an example of a band calculation result of the two-dimensional photonic crystal according to the first example.

FIG. 12 illustrates an example of a band calculation result in the case where r=0.36a. The horizontal axis represents a wave number vector, and the vertical axis represents a normalized frequency (obtained by multiplying the cycle distance "a" to the frequency and dividing the same by the light speed c) of the photonic band. According to this graph, the complete PBG is formed in a range of the normalized frequency from 0.355 to 0.437.

Figure 13:
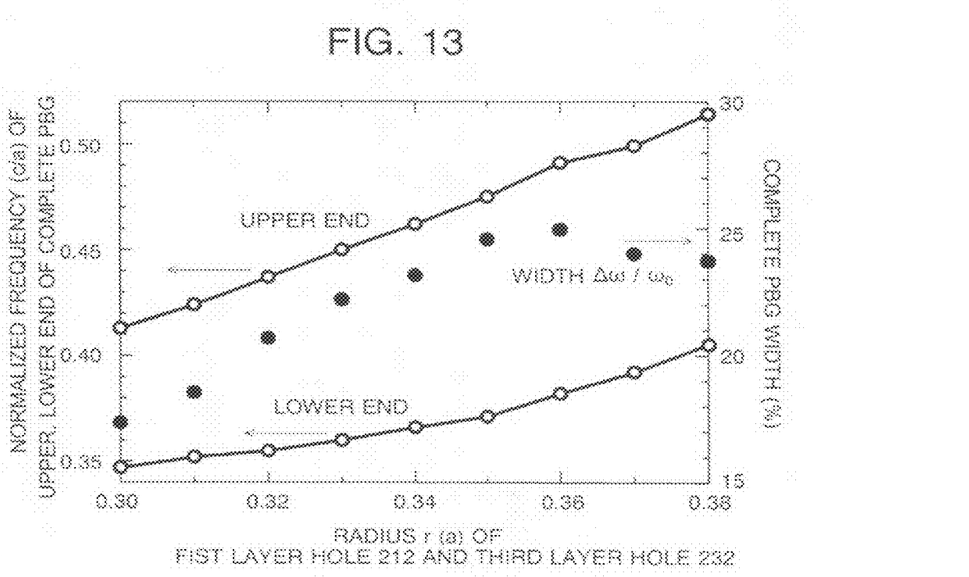
FIG. 13 is a graph illustrating a calculation result of the relationships among the radius r of a first layer hole 212 and a third layer hole 232, the upper limit value and the lower limit value of a complete PBG, and the value $\Delta\omega/\omega_0$ of the two-dimensional photonic crystal according to the first example.
Figure 14:
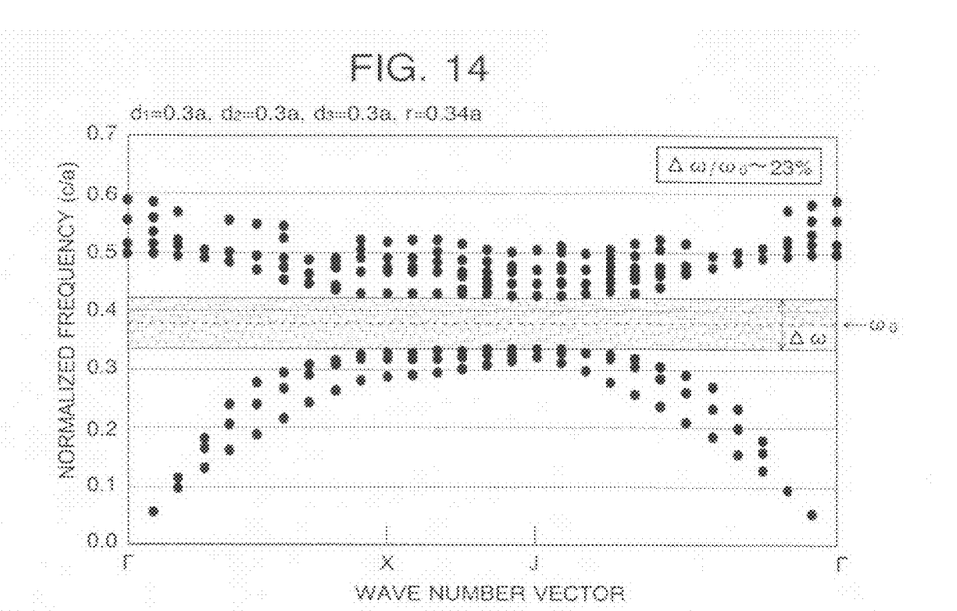
FIG. 14 is a graph illustrating another example of the band calculation result of the two-dimensional photonic crystal according to the first example.

Similar calculation was performed in a range of r from 0.30 to 0.38, so as to determine an upper end value, a lower end value and a value $\Delta\omega/\omega_0$ of the complete PBG (FIGS. 13 and 14). Here, $\Delta\omega/\omega_0$ is defined as a percentage of a value obtained by dividing the frequency width $\Delta\omega$ of the PBG by the median $\omega_0$ of the complete PBG, which indicates a relative change of the complete PBG due to a variation of conditions such as the radius r.

FIG. 13 is a graph illustrating changes of the upper end value, the lower end value and the value $\Delta\omega/\omega_0$ of the complete PBG obtained by the above calculation in accordance with the radius r. It became clear from this graph that the complete PBG having the width as large as 15% to 25% was obtained in each calculation range, which cannot be obtained in the conventional two-dimensional photonic crystal.

FIG. 14 illustrates an example of a band calculation result in the case where the individual layers have thicknesses different from those in FIGS. 12 and 13. In this example, each of the first layer 21, the second layer 22 and the third layer 23 has a thickness of 0.3a, and a value of r is set to be 0.34a. From this result, a value of $\Delta\omega/\omega_0$ is 23% which is substantially the same as in the case of FIG. 13.

EXAMPLE 2

Figure 15:
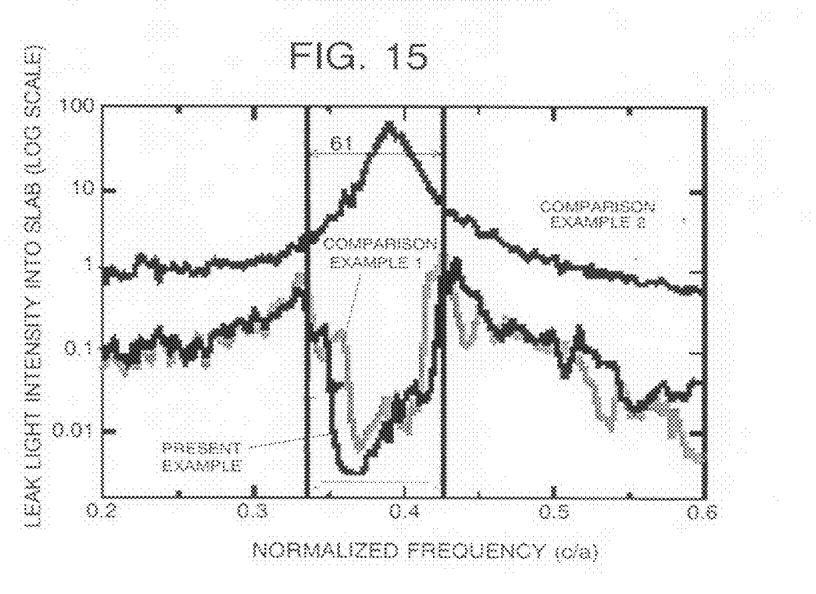
FIG. 15 is a graph illustrating a calculation result of the intensity of light leaking from the point-like defect resonator to the crystal in the two-dimensional photonic crystal 40 for a thermal radiation light source.

A calculation result concerning the thermal radiation light source using the two-dimensional photonic crystal of the present invention is described below. In the two-dimensional photonic crystal 40 for a thermal radiation light source described above, it is necessary to prevent light of the TM mode that is obtained by the thermal radiation and is amplified by the point-like defect resonator 35P from leaking into the two-dimensional photonic crystal 40. Here, intensity of the leaking light of the TM mode was calculated (the present example). In addition, as a comparison example, the same calculation is performed for the two-dimensional photonic crystal described in Non-Patent Document 1 (Comparison example 1) and a slab having a thickness of 0.8a in which the first semiconductor plate member 4311 and the second semiconductor plate member 4312 are laminated alternately without the modified refractive index area, i.e. it is not a two-dimensional photonic crystal (Comparison example 2). The result is shown in FIG. 15. This result indicates that the present example can suppress the leaking light of the TM mode in a frequency domain 61 corresponding to the complete PBG similarly to the comparison example 1 more than the comparison example 2.

EXAMPLE 3

Figure 16:
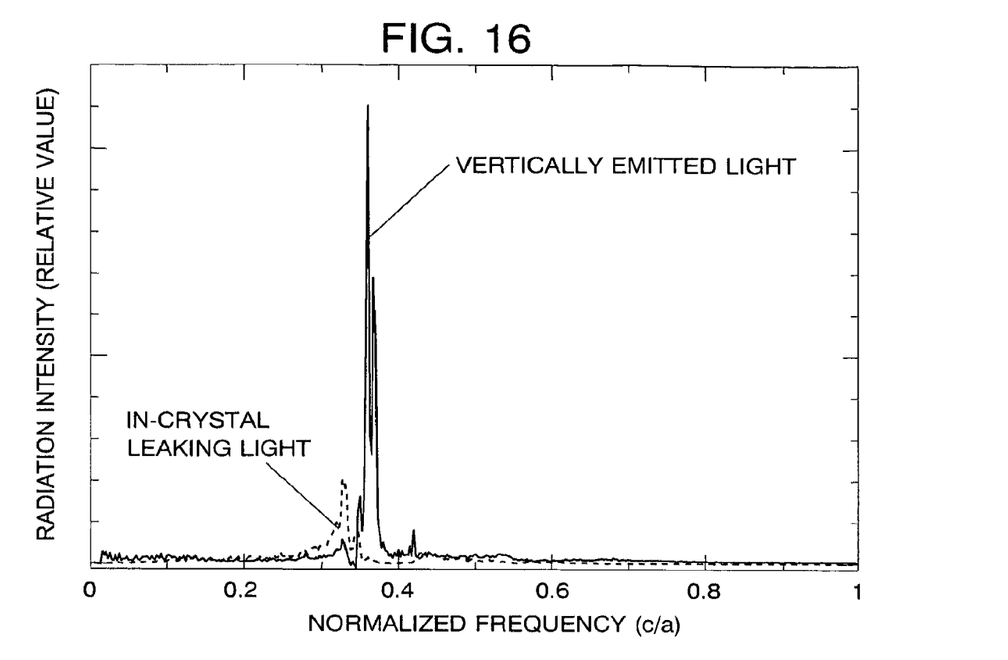
FIG. 16 is a graph illustrating a calculation result of thermal radiation spectra of vertically emitted light and in-crystal emitted light of the two-dimensional photonic crystal for a thermal radiation light source having a regular triangle column defect 322B.
Figure 17:
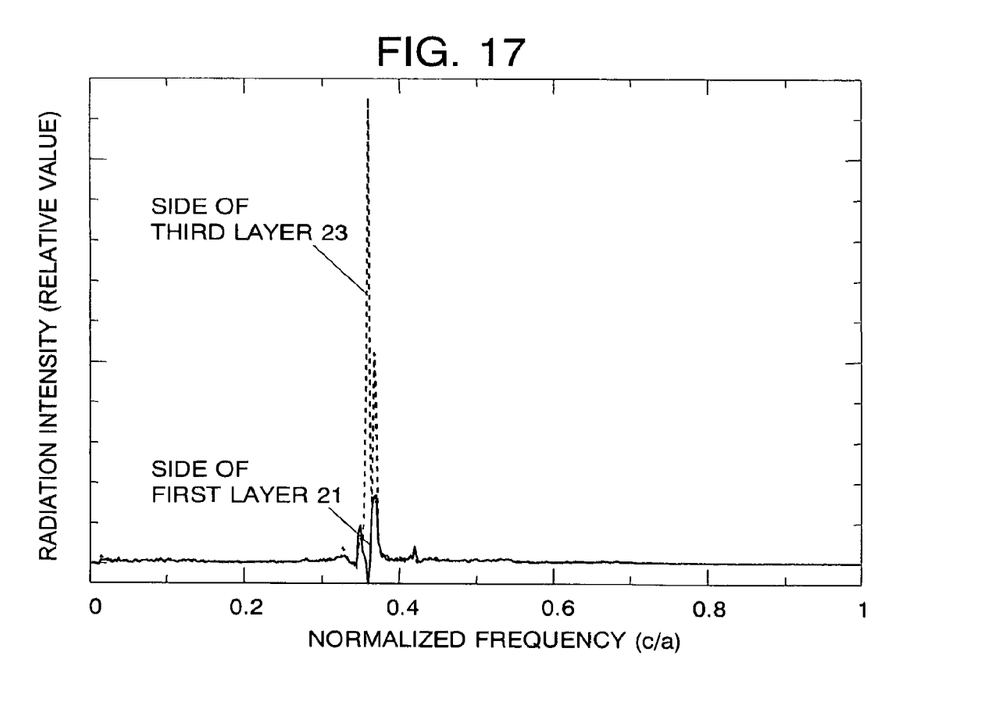
FIG. 17 is a graph illustrating a calculation result of thermal radiation spectra of vertically emitted light toward the first layer 21 and the vertically emitted light toward the third layer 23 of the two-dimensional photonic crystal for a thermal radiation light source having a regular triangle column defect 322B.

The two-dimensional photonic crystal for a thermal radiation light source includes the first layer and the third layer having the same structure as the two-dimensional photonic crystal 40 as described above. In the second layer, the above-mentioned dielectric columns 222B are disposed instead of the cylindrical dielectric columns 222. Concerning such a two-dimensional photonic crystal, spectra of the thermal radiation light emitted in the direction perpendicular to the first layer 21 and the third layer 23 (vertically emitted light) and light leaking into the two-dimensional photonic crystal (in-crystal leaking light) are calculated. The result is shown in FIG. 16. From this result, it is understood that the vertically emitted light can be obtained with sufficiently large intensity compared with the light leaking into the two-dimensional photonic crystal. In addition, a result of calculating spectrums of light emitted to the side of the first layer 21 (i.e., the side without the lamination structure of the first semiconductor plate member 4111 and the second semiconductor plate member 4112) and light emitted to the side of the third layer 23 (i.e., the side with the lamination structure) concerning the vertically emitted light is shown in FIG. 17. From this result, it is understood that most of the vertically emitted light is emitted from the side of the third layer 23. Therefore, if it is intended to emit the thermal radiation light only in one direction, the point-like defect resonator constituted of only the regular triangle column defect 322B can be used preferably.

The invention claimed is:

1. A two-dimensional photonic crystal comprising:
   a) a first layer composed of a first medium made of a dielectric plate in which first modified refractive index areas having a refractive index lower than that of the first medium are arranged cyclically;
   b) a second layer formed on the first layer, the second layer composed of a second medium having a predetermined dielectric constant in which second modified refractive index areas having a refractive index higher than that of the second medium are arranged with the same cycle as the first modified refractive index areas; and
   c) a third layer formed on the second layer, the third layer composed of a third medium made of a dielectric plate in which third modified refractive index areas having a refractive index lower than that of the third medium are arranged with the same cycle as the first modified refractive index areas.

2. The two-dimensional photonic crystal according to claim 1, wherein
   the first modified refractive index areas are arranged at lattice points of a first triangular lattice,
   the third modified refractive index areas are arranged at lattice points of a third triangular lattice which is a lattice rotated by 180 degrees about an axis that is perpendicular to the third layer and passes through a barycenter of a regular triangle constituted of three nearest lattice points in the first triangular lattice, and
   the second modified refractive index areas are arranged at lattice points of a second triangular lattice where each of the lattice points is at the barycenter.

3. The two-dimensional photonic crystal according to claim 1, wherein the second medium is air.

4. The two-dimensional photonic crystal according to claim 1, wherein the first modified refractive index areas and the third modified refractive index areas are made of air.

5. The two-dimensional photonic crystal according to claim 1, further comprising:
   a point-like defect resonator constituted of at least one defect formed in at least one of the first modified refractive index areas, the second modified refractive index areas and the third refractive index areas; and
   a waveguide that is disposed in a vicinity of the point-like defect resonator and is constituted of a linear defect formed in at least one of the first modified refractive index areas, the second modified refractive index areas and the third refractive index areas.

6. The two-dimensional photonic crystal according to claim 1, further comprising:
   a point-like defect resonator constituted of at least one defect formed in at least one of the first modified refractive index areas, the second modified refractive index areas and the third refractive index areas, and
   a quantum well structure in which one or more of the first medium, the second modified refractive index areas and the third medium are constituted of a plurality of types of laminated semiconductors, and transition energy between subbands corresponding to the resonance wavelengths of the point-like defect resonator is formed.

7. A manufacturing method of a two-dimensional photonic crystal comprising the steps of:
   a) forming second modified refractive index areas constituted of dielectric column members cyclically on a substrate;
   b) heat-bonding one ends of the column members to a first layer including a first medium constituted of a dielectric plate and first modified refractive index areas that have a refractive index lower than that of the first medium and are arranged cyclically in the first medium;
   c) removing the substrate; and
   d) heat-bonding the other ends of the column members to a third layer including a third medium constituted of a dielectric plate and third modified refractive index areas that have a refractive index lower than that of the third medium and are arranged cyclically in the third medium.

8. The two-dimensional photonic crystal according to claim 2, wherein the second medium is air.

9. The two-dimensional photonic crystal according to claim 2, wherein the first modified refractive index areas and the third modified refractive index areas are made of air.

10. The two-dimensional photonic crystal according to claim 2, further comprising:
    a point-like defect resonator constituted of at least one defect formed in at least one of the first modified refractive index areas, the second modified refractive index areas and the third refractive index areas; and a waveguide that is disposed in a vicinity of the point-like defect resonator and is constituted of a linear defect formed in at least one of the first modified refractive index areas, the second modified refractive index areas and the third modified refractive index areas.

11. The two-dimensional photonic crystal according to claim 2, further comprising:

a point-like defect resonator constituted of at least one defect formed in at least one of the first modified refractive index areas, the second modified refractive index areas and the third modified refractive index areas, and a quantum well structure in which one or more of the first medium, the second modified refractive index areas and the third medium are constituted of a plurality of types of laminated semiconductors, and transition energy between subbands corresponding to the resonance wavelengths of the point-like defect resonator is formed.

12. The two-dimensional photonic crystal according to claim 3, wherein the first modified refractive index areas and the third modified refractive index areas are made of air.

13. The two-dimensional photonic crystal according to claim 8, wherein the first modified refractive index areas and the third modified refractive index areas are made of air.

* * * * *